United States Patent [19]

Stout et al.

[11] Patent Number: 5,212,990
[45] Date of Patent: May 25, 1993

[54] METHOD AND APPARATUS FOR DETERMINING FLOW RATES OF WELL FLUID CONSTITUENTS

[75] Inventors: Christopher A. Stout, Carrollton; Kenneth Schwendemann, Lewisville; Roger L. Schultz, Richardson, all of Tex.

[73] Assignee: Halliburton Company, Duncan, Okla.

[21] Appl. No.: 684,084

[22] Filed: Apr. 10, 1991

[51] Int. Cl.⁵ .............................................. G01F 1/74
[52] U.S. Cl. ...................................... 73/861.04; 73/200
[58] Field of Search ...................... 73/861.04, 200, 202

[56] References Cited

U.S. PATENT DOCUMENTS

| 4,429,581 | 2/1984 | Furmaya | 73/861.04 |
| 4,881,412 | 11/1989 | Nothedge | 73/861.04 |
| 4,932,788 | 6/1990 | Yeh | 73/861.04 |

OTHER PUBLICATIONS

"Surface Well Testing Equipment–Ten Ways to enhance safety as you realize greater accuracy" published in Jan., 1990, by Halliburton Reservoir Services.
Primer of Oil and Gas Production, published 1976, by the American Petroleum Institute, pp. 33–38.
Fundamentals of Drilling–Technology and Economics, John L. Kennedy, PennWell Books (1983), pp. 187–189.

Primary Examiner—Herbert Goldstein
Attorney, Agent, or Firm—Jennifer R. Daunis; Neal R. Kennedy

[57] ABSTRACT

A method and apparatus for determining flow rates of well fluid constituents on a much smaller scale than with prior art equipment. Rather than testing the total fluid stream, a sample stream portion is diverted from the total fluid stream and tested. The sample fluid stream portion is separated into its various constituents, and the mass flow rate of each constituent is determined. The total mass flow rate of the total fluid stream is measured and compared with the total mass flow rate of fluid flowing through the sample stream portion, so the total flow rate of each constituent may be calculated.

17 Claims, 2 Drawing Sheets

METHOD AND APPARATUS FOR DETERMINING FLOW RATES OF WELL FLUID CONSTITUENTS

BACKGROUND OF THE INVENTION

1. Field Of The Invention

This invention relates to the determination of flow rates of well fluid constituents, and more particularly, to a method and apparatus where such determination is made by taking and extrapolating measurements of a sample fluid stream rather than directly measuring the total fluid stream.

2. Description Of The Prior Art

After an oil or gas well has been drilled, it is necessary and desirable to determine the flow rates of the various constituents of the well fluid. For example, in a "three-phase" well fluid, these constituents are oil, gas and water.

In previous testing, a fluid stream is flowed from the well through a surface test tree at the wellhead into a processor. This fluid stream is throttled through a choke manifold, but a fairly large fluid stream is required to insure that the constituents of the fluid stream are representative of those in the well. The fluid stream is generally flowed into a heater and separator in the processor, both sized to accommodate the appropriate flow. The separator separates the fluid into its gas, oil and water constituents. The separated constituents are flowed out of the separator in individual lines. The flow rate of the constituent in each line is measured, so that the operator will know the relative amounts of each. After these measurements are made, the liquid constituents may be recombined into a single line and the gas constituent flared. The single liquid line may be flowed into an test tank in which a total flow rate may be determined for insuring proper calibration of the individual flow meters. The fluid is then pumped to a burner where it is eliminated.

A problem with this prior art method is that it requires the heater, separator, meters, test tank and pump to be sized to accommodate the total fluid flow from the wellhead. Obviously, this also requires the appropriately sized piping and fittings in the processor. Such equipment is relatively expensive, and the size of it requires a great deal of rig space. Space is at a particular premium on offshore drilling rigs. Transportation of such large equipment is also fairly expensive because of its weight and bulk.

An additional problem with prior processors used in determining the flow rate of well constituents is that the pressure vessels, such as the separator and test tank, usually must be of a size that requires certification under the American Society of Mechanical Engineers Boiler and Pressure Vessel Test Code.

Accordingly, there is a need for a test method and apparatus which utilizes smaller and lighter equipment to save on rig space and transportation problems. Additionally, it is desirable to have tanks small enough that they fall below the requirements of ASME specifications. Of course, these reductions in size would also greatly reduce the cost of the apparatus. The present invention addresses these needs by providing a method and apparatus which may be used for determining the flow rates of well constituents on a much smaller scale than previously known equipment.

SUMMARY OF THE INVENTION

The method and apparatus of the present invention are adapted for determining flow rates of well fluid constituents on a much smaller scale than in the prior art. The method of determining flow rates comprises the steps of flowing a fluid stream from a wellhead of a well, mixing the fluid stream, measuring a total mass flow rate of the fluid stream, diverting a sample stream portion of the fluid stream, separating the fluid constituents of the sample stream portion, measuring a relative mass flow rate of each of the separated constituents in the sample stream portion, and calculating a total mass flow rate of each of the fluid constituents based on the relative mass flow rate thereof with respect to the total mass flow rate of the total fluid stream. The method may also comprise the steps of mixing the fluid stream and heating the sample stream portion prior to the step of separating the constituents of the sample stream portion.

The method may further comprise the step of returning the sample stream portion to the remainder of the total fluid stream after the step of measuring the relative mass flow rate of each of the separated constituents. The separated fluid constituents may be rejoined prior to this step of returning. In one preferred embodiment, the step of returning the sample stream portion to the fluid stream comprises directing the constituents to a test tank and pumping fluid from the test tank to the fluid stream.

In a preferred embodiment, an additional step of comparing a density of fluid in the fluid stream with a density of fluid in the sample stream portion is also utilized. This provides a means of insuring that the sample stream portion is representative of the total fluid stream.

The step of measuring the relative mass flow rate of each of these separated constituents comprises measuring a mass flow rate of the sample stream portion prior to separating, and measuring a flow rate of each of the fluid constituents after separating. Measuring the flow rate is accomplished with meters disposed in each constituent line. The meters may be calibrated by measuring a quantity of fluid flowing over a selected period of time into a test tank downstream from the meters.

A preferred embodiment of the apparatus for measuring flow rates through a flow line comprises a sample line connectable to the flow line such that a sample stream may be diverted from the total fluid stream, a mass flow meter in the sample line, a separator comprising an inlet connected to the sample line and an outlet for each of the constituents of the fluid stream, a constituent line connected to each of the outlets of the separator, flow measuring means for measuring flow through each of the constituent lines, and a return line in communication with the constituent lines and connectable to the flow line.

The apparatus may also comprise a heater upstream from the separator and a mixing means for mixing the fluid stream upstream from the separator. The mixing means is preferably characterized by a mixer positionable in the flow line upstream from the sample line.

The apparatus may further comprise a mass flow meter for measuring the total mass flow rate of fluid flowing through the flow line and a smaller mass flow meter for measuring the mass flow rate of fluid flowing through the sample line to the separator. The flow measuring means is preferably characterized by the smaller mass flow meter and a volumetric flow meter disposed in each of the constituent lines.

The apparatus may further comprises a test tank and a pump in the return line.

The apparatus may further comprise a burner downstream from the return line for burning at least the hydrocarbons of the fluid stream. A water knock-out may be provided before the burner as necessary.

An important object of the invention is to provide a method and apparatus for determining the flow rate of well fluid constituents on a much smaller scale than previously known equipment.

Another object of the invention is to provide a method and apparatus for determining the flow rate of well fluid constituents wherein the relative flow rates of the constituents are determined by measuring a sample fluid stream rather than the total fluid stream.

Additional objects and advantages of the invention will become apparent as the following detailed description of the preferred embodiment is read in conjunction with the drawings which illustrate such preferred embodiment.

DESCRIPTION OF THE PREFERRED EMBODIMENT

Figure 1:
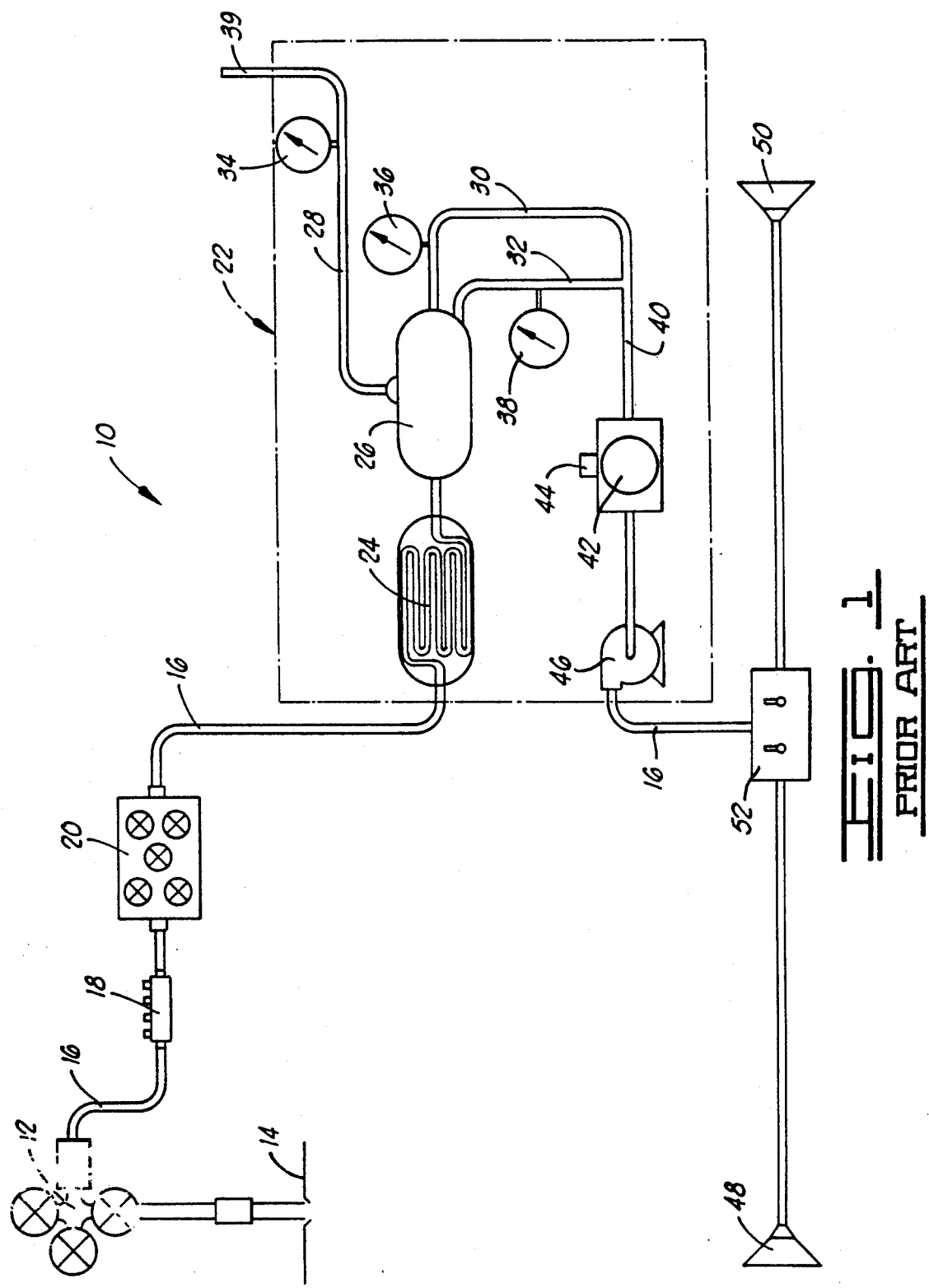
FIG. 1 is a schematic of a prior art apparatus for testing flow rates of well fluid constituents which uses a processor through which the total test fluid stream is flowed.

Referring now to the drawings, a prior art testing apparatus and the apparatus of the present invention will be discussed.

PRIOR ART APPARATUS

Referring to FIG. 1, a prior art testing apparatus for determining the flow rates of well fluid constituents is shown and generally designated by the numeral 10. Prior art apparatus or system 10 is connected to a surface test tree 12 at a wellhead 14. A flow line 16 connects prior art apparatus 10 with surface test tree 12. Flow line 16 includes a number of components piped therein.

One such component is a data header 18. This provides a convenient location for the connection of temperature probes and pressure gauges used to monitor the fluid flowing through flow line 16. Ports in the data header may also be used for chemical injection, sand probes and other measurements.

Another component in flow line 16 is a choke manifold 20 which includes one or more valves which are used to accurately throttle the flow from the well so that the fluid pressure downstream from the choke manifold is reduced. The fluid pressure from the well may be too great to be accommodated by the components of apparatus 10 without choke manifold 20.

Downstream from choke manifold 20 is a fluid processor 22. In processor 22, the fluid first flows into a heater 24. Heater 24 is frequently required to heat the fluid so that the oil-water emulsion therein is broken, but the heater may not be required under all test conditions. The fluid flows from heater 24 into a separator 26 in which the various constituents of the well fluid are separated. The illustrated embodiment is for a system handling a three-phase fluid, and accordingly, has a gas line 28 discharging from the top of separator 26, an oil line 30 discharging from an intermediate portion of the separator, and a water line 32 discharging near the bottom of the separator.

An orifice-type gas flow meter 34 is disposed in gas line 28. A volumetric oil flow meter 36 is disposed in oil line 30, and a volumetic water flow meter 38 is disposed in water line 32.

Downstream from gas flow meter 34, gas line 28 is connected to a flare 39, through which the gas constituent is flared to the atmosphere.

Downstream from meters 36 and 38, oil line 30 and water line 32 may be rejoined in a flow line portion 40 which is part of overall flow line 16. In some prior art testing apparatus, water line 32 is not rejoined with oil line 30, but is instead directed to a tank in which the water may be treated for later disposal. In some cases, the water in this tank is pumped into oil line 16 downstream from fluid processor 22 as necessary. Also, in some cases, oil line 30 is connected directly to burner valve manifold 52.

Flow line 40 is connected to a test tank 42. Test tank 42 may be used to calibrate the total flow through flow meters 34, 36 and 38 by measuring the amount of fluid that enters the tank over a predetermined time. This measurement can be made by such means as a liquid level indicator 44 on test tank 42.

The well fluid is pumped out of fluid processor 22 by a pump 46. The pump fluid is discharged through flow line 16 to a burner apparatus 48 and/or 50. One such burner may be used depending upon its construction. In the illustrated embodiment, two burners 48 and 50 are indicated, and the flow from fluid processor 22 to one or both of the burners is controlled by a burner valve manifold 52.

Operation Of The Prior Art Apparatus

In the operation of prior art apparatus 10, the fluid is flowed to processor 22 as described. The fluid is heated in heater 24 as necessary, and the fluid is separated in separator 26. The individual measurements of the gas, oil and water streams are found by meters 34, 36 and 38, respectively. In this way, the relative proportion of the well constituents is obtained. As indicated, the total flow rate may be checked 20 by measuring the liquid level in test tank 42 over a period of time. This will provide an indication that the total flow rate through meters 34, 36 and 38 is accurate.

The Present Invention

Figure 2:
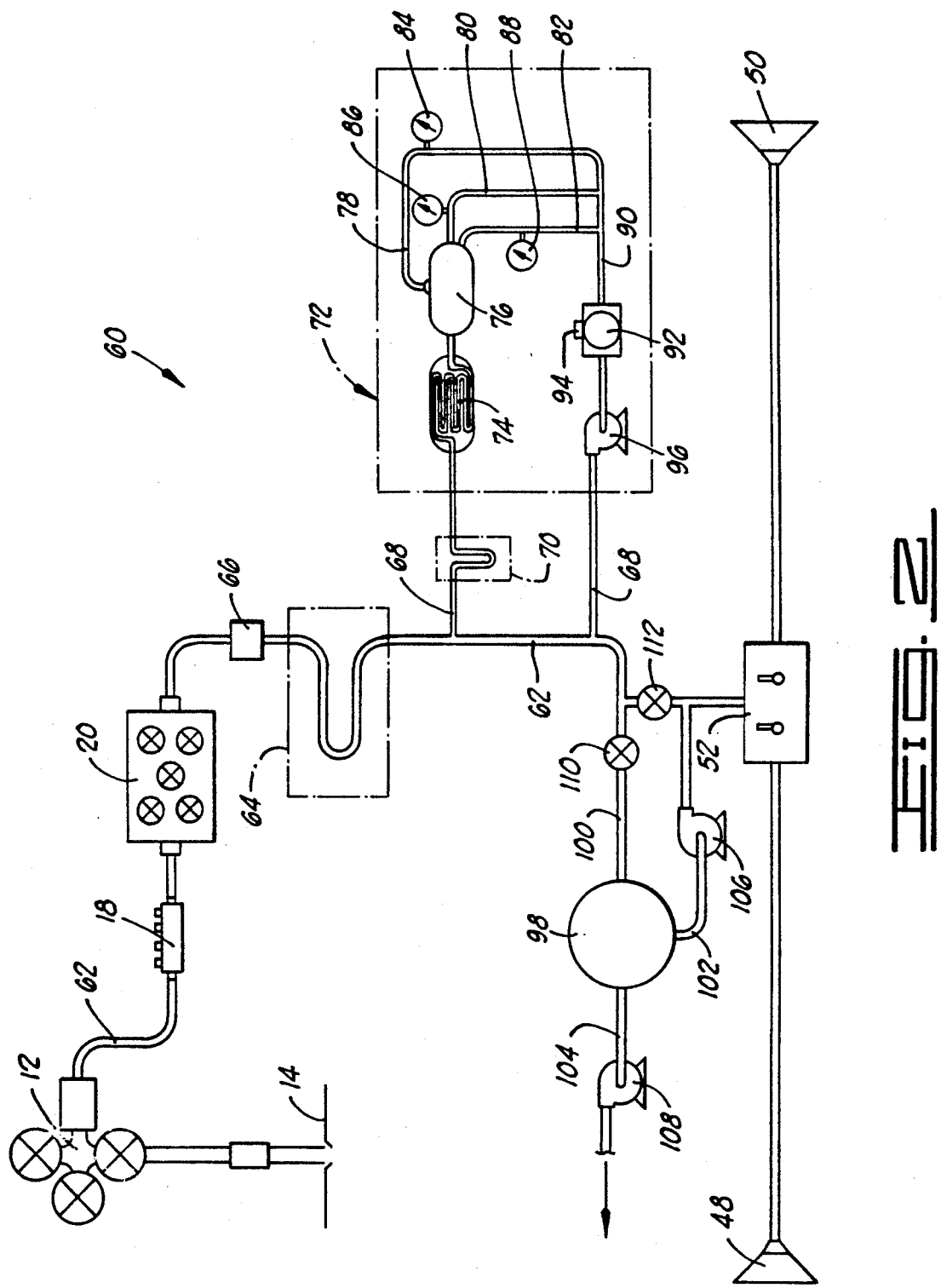
FIG. 2 is a schematic of the test apparatus for determining flow rates of well fluid constituents of the present invention.

Referring now to FIG. 2, the apparatus of the present invention for determining flow rates of well constituents on a much smaller scale is shown and generally designated by the numeral 60. Apparatus or system 60 includes some of the same components in prior art apparatus 10, and those same reference numerals will be used. As in the prior art, apparatus 60 is connected to a surface test tree 12 at a wellhead 14 by a flow line 62. Flow line 62 may include data header 18 and choke manifold 20 which are used in the same manner as previously described. Downstream from choke manifold 20 is a mixer 66 which insures that the fluid stream is homogeneous and does not separate prematurely.

Fluid discharged from mixer 66 enters a mass flow meter 64 which measures the total mass flow rate of the fluid flowing through flow line 62. The meter itself is of a kind known in the art and also provides a measurement of the density of the fluid. Flow line 62 is directly connected from flow meter 64 to burner valve manifold 52, and the majority of the fluid flows from flow meter 64 directly to burners 48 and/or 50 through line 62 and burner manifold 52.

A sample fluid line 68 diverts a relatively small sample of fluid from flow line 62 into a relatively small mass flow meter 70 which measures the total mass flow rate of the sample fluid stream flowing through sample line 68. Mass flow meter 70 also provides a density measurement for the sample fluid stream.

The sample fluid stream enters a mini-processor 72 which has a somewhat similar configuration and function of prior art processor 22, except that mini-processor 72 uses much smaller and less expensive components and does not flare the gas. The sample fluid stream enters a heater 74, which may or may not be necessary depending upon the flow conditions, and then flows into a small separator 76. The sample fluid stream is separated in separator 76 into its various constituents and discharged from the separator in individual lines. For example, in FIG. 2, the constituents of a three-phase fluid are discharged through a gas line 78, an oil line 80 and a water line 82. Gas line 78 has an orifice-type gas flow meter 84, oil line 80 has a volumetric oil flow meter 86, and water line 82 has a volumetric water flow meter 88 therein.

Downstream from meters 84, 86 and 88, gas line 78, oil line 80 and water line 82 are rejoined in a sample flow line 90 which is connected to a small test tank 92. The total flow rate of fluid through mini-processor 72 may again be checked to help calibrate gas meter 84, oil meter 86 and water meter 88, as well as mass flow meter 70, by measuring the amount of fluid entering test tank 92 over a period of time. A level indicator 94 may be provided in obtaining this measurement.

The sample fluid stream is pumped out of mini-processor 72 by a pump 96 and through sample line 68 back into main flow line 62 so that the sample fluid stream portion rejoins the remainder of the total fluid stream. It will be seen by those skilled in the art that the total fluid stream flowing through system 60 thus is directed to burner valve manifold 52.

In wells which may produce a substantial amount of water, it may be necessary to knock out some of the water in the liquid flowing through flow line 62 to burner valve manifold 52. In such cases a water knock-out 98 is connected to line 62 by an inlet line 100. Water knock-out 98 is of a kind known in the art and has an oil outlet line 102 and a water outlet line 104 discharging therefrom. An oil pump 106 is disposed in oil outlet line 102 and may be used to return oil to line 62 and oil burner manifold 52. A water pump 108 may be disposed in water outlet line 104 to pump the separated water to a treatment or disposal location.

Inlet line 100 has a valve 110 therein, and flow line 62 has another valve 112 therein between inlet 100 and oil outlet line 102. Valves 110 and 112 are used to direct the liquid flow through water knock-out 98 or to bypass it. That is, when valve 110 is open and valve 112 is closed, the liquid will be flowed through water knock-out 98. When valve 110 is closed and valve 112 is open, the liquid will bypass water knock-out 98 and flow directly to oil burner manifold 52.

Operation Of The Present Invention

As indicated, testing apparatus 60 utilizes a relatively small sample fluid stream which is diverted from the main or total fluid stream flowing through flow line 62. The density and total mass flow rate of the main fluid stream is measured by meter 64, and the density and mass flow rate of the fluid stream is measured by mass flow meter 70. If these measured densities are substantially equal, then the operator will know that a representative fluid sample has been diverted through sample line 68.

The flow rates of the individual constituent portions of the sample fluid stream are measured by meters 84, 86 and 88, and as indicated, this can be calibrated in a manner similar to the prior art by measuring the flow into test tank 92 over a period of time.

Because the relative flow rates of each of the well constituents of the sample fluid stream are known by measuring with meters 84, 86 and 88, the total mass flow rate of each of the well constituents in the fluid stream may be calculated. This information can then be used to calculate the mass flow rate of each of the constituents of the total fluid stream flowing through the system because the total mass flow rate has been measured using meter 64 and the sample mass flow rate has been measured using meter 70. In other words, because the relative flow rates of the well constituents of the sample fluid are known, this can be extrapolated to calculate the mass flow rate of the well constituents of the total fluid stream.

Because a small fluid sample is diverted through mini-processor 72, the components thereof may be much smaller and therefore less expensive than those required in prior art system 10 in which the total flow stream is separated into its various constituents and measured. Because the equipment is smaller, there is a savings in rig space as well as cost. Also, mini-processor 72 may be sized such that separator 76 and test tank 92 are smaller than the bottom range of tanks which are specified by the American Society of Mechanical Engineers Boiler and Pressure Vessel Test Code. Additionally, all of the piping in sample line 68 is likewise smaller than that required in the prior art.

It will be seen, therefore, that the method and apparatus of determining flow rates of well fluid constituents on a much smaller scale of the present invention are well adapted to carry out the ends and advantages mentioned as well as those inherent therein. While a presently preferred embodiment of the invention has been described for the purposes of this disclosure, numerous changes in the steps of the method and in the arrangement and construction of parts in the apparatus may be made by those skilled in the art. All such changes are encompassed within the scope and spirit of the appended claims.

What is claimed is:

1. A method for determining flow rates of well fluid constituents, said method comprising the steps of:
   measuring a fluid stream from a well head of a well;
   measuring a total mass flow rate of said fluid stream;
   diverting a sample stream portion of said fluid stream;
   separating the fluid constituents of said sample stream portion;
   measuring a relative mass flow rate of each of the separated constituents in said sample stream portion, said step of measuring a relative mass flow rate comprising:
   measuring a mass flow rate of said sample stream portion prior to said step of separating; and measuring a volumetric flow rate of each of said fluid constituents after said step of separating; and calculating a total mass flow rate of each of said fluid constituents based on said relative mass flow rate thereof and said total mass flow rate of said fluid stream.

2. The method of claim 1 further comprising the step of mixing said fluid stream prior to said step of measuring said total mass flow rate.

3. The method of claim 1 further comprising the step of heating said sample stream portion prior to said step of separating.

4. The method of claim 1 further comprising returning said sample stream portion to a remainder of said fluid stream after said step of measuring.

5. The method of claim 4 further comprising rejoining the separated fluid constituents prior to said step of returning.

6. The method of claim 4 wherein said step of returning comprises:

directing said constituents to a tank;

pumping fluid from said tank to said fluid stream.

7. The method of claim 1 further comprising the step of comparing a density of fluid in said fluid stream with a density of fluid in said sample stream portion.

8. The method of claim 1 wherein said step of measuring a volumetric flow rate of each of said fluid constituents comprises measuring said volumetric flow rate on a corresponding meter disposed in a separate flow line for each of said fluid constituents.

9. The method of claim 8 further comprising the step of calibrating said meters by measuring a quantity of fluid flowing over a selected period of time into a test tank downstream from said meters.

10. The method of claim 1 wherein said sample fluid stream is separated into a gas stream, an oil stream, and a water stream.

11. An apparatus for measuring flow rates of constituents of a well fluid stream flowing through a flow line, said apparatus comprising:

a mass flow meter for measuring a mass flow rate of fluid flowing through the flow line;

a sample line connectable to said flow line such that a sample stream may be diverted from the total fluid stream;

a separator comprising:

an inlet connected to said sample line; and an outlet for each of said constituents of said fluid stream;

a mass flow meter for measuring a mass flow rate of fluid flowing through said sample line to said separator;

a constituent line connected to each of said outlets of said separator, the constituent lines comprising a gas constituent line, an oil constituent line and a water constituent line;

a flow measuring means in each of said constituent lines for measuring fluid flow therethrough, said flow measuring means being characterized by:

a gas flow meter disposed in said gas constituent line;

a volumetric flow meter in said oil constituent line; and a volumetric flow meter disposed in said water constituent line; and a return line in communication with said constituent lines and connectable to said flow line.

12. The apparatus of claim 11 further comprising a heater disposed in said sample line upstream from said separator.

13. The apparatus of claim 11 further comprising mixing means for mixing said fluid stream upstream from said sample line.

14. The apparatus of claim 11 further comprising a mass flow meter for measuring total mass flow rate of fluid flowing through said flow line.

15. The apparatus of claim 11 further comprising a test tank in said return line.

16. The apparatus of claim 11 further comprising a pump in said return line.

17. The apparatus of claim 11 further comprising a water knock-out downstream from said return line.

* * * * *